(12) United States Patent
Ganev et al.

(10) Patent No.: US 9,331,550 B2
(45) Date of Patent: May 3, 2016

(54) AIR COOLING OF A MOTOR USING RADIALLY MOUNTED FAN

(71) Applicant: HONEYWELL INTERNATIONAL, INC., PATENT SERVICES M/S AB/2B, Morristown, NJ (US)

(72) Inventors: Evgeni Ganev, Torrance, CA (US); Stephen L White, Whitter, CA (US); Leroy Allen Fizer, Huntington Beach, CA (US); Norman Clampitt, Long Beach, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 250 days.

(21) Appl. No.: 13/919,889

(22) Filed: Jun. 17, 2013

(65) Prior Publication Data
US 2014/0368066 A1  Dec. 18, 2014

(51) Int. Cl.
*H02K 9/04* (2006.01)
*H02K 9/06* (2006.01)

(52) U.S. Cl.
CPC ... *H02K 9/06* (2013.01); *H02K 9/04* (2013.01)

(58) Field of Classification Search
CPC .................................. H02K 9/06; H02K 9/04
USPC ................................ 310/62, 64, 201, 263, 63
IPC ....................................................... H02K 009/04
See application file for complete search history.

(56) References Cited

U.S. PATENT DOCUMENTS

| 7,345,385 B2 * | 3/2008 | Kreitzer ......................... 310/59 |
| 8,167,585 B2 * | 5/2012 | Kreitzer et al. ................ 417/368 |

FOREIGN PATENT DOCUMENTS

JP                09056118 A  *  2/1997

OTHER PUBLICATIONS

Machine Translation, Korogi, JP 09056118 A, Feb. 25, 1997.*

* cited by examiner

*Primary Examiner* — Thomas Truong
(74) *Attorney, Agent, or Firm* — Shimokaji IP

(57) ABSTRACT

A motor cooling system is provided comprising an electric motor including a rotor having first and second axial ends, and a stator having first and second axial ends, a motor housing surrounding the motor including an air chamber extending around the motor and axially along the motor length, a motor enclosure enveloping the motor housing, and a cooling fan radially mounted to the motor enclosure and adapted to operatively cool said electric motor.

2 Claims, 6 Drawing Sheets

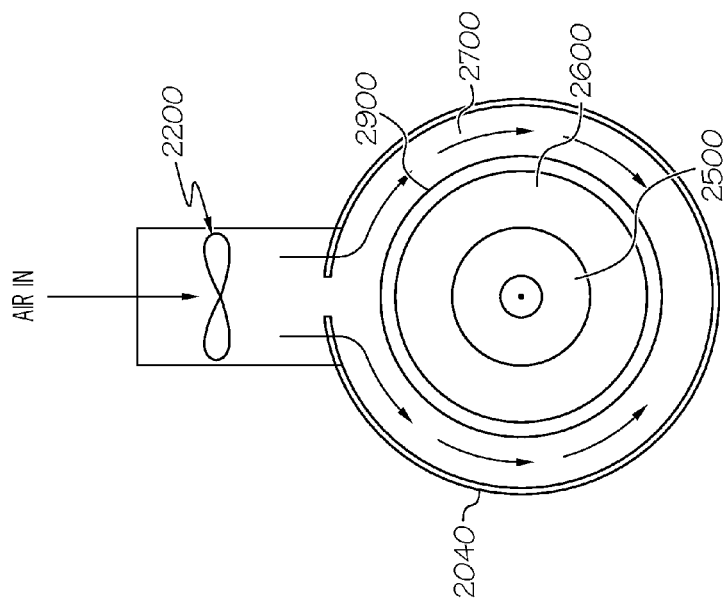
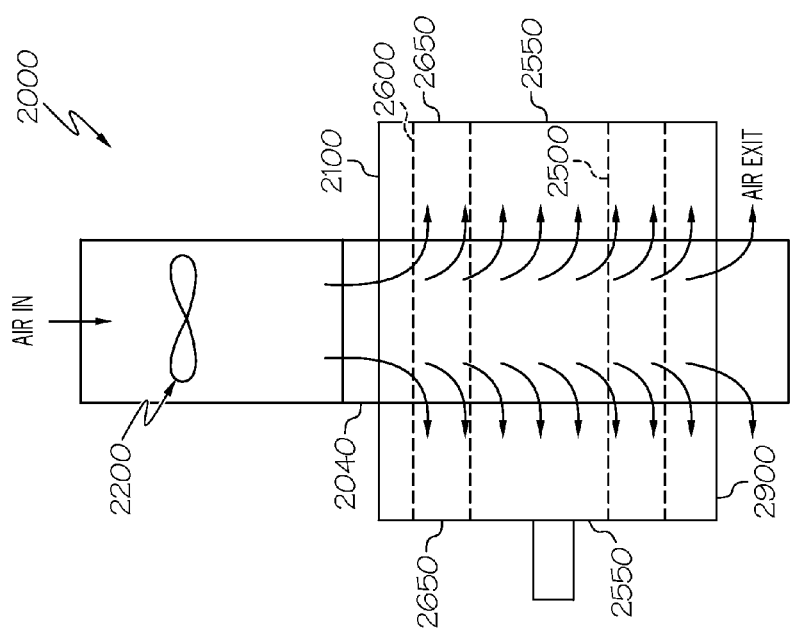

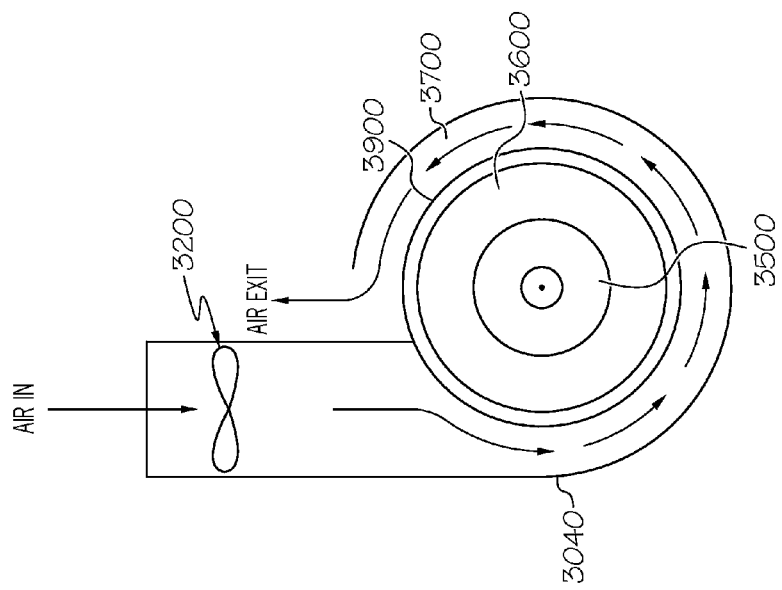
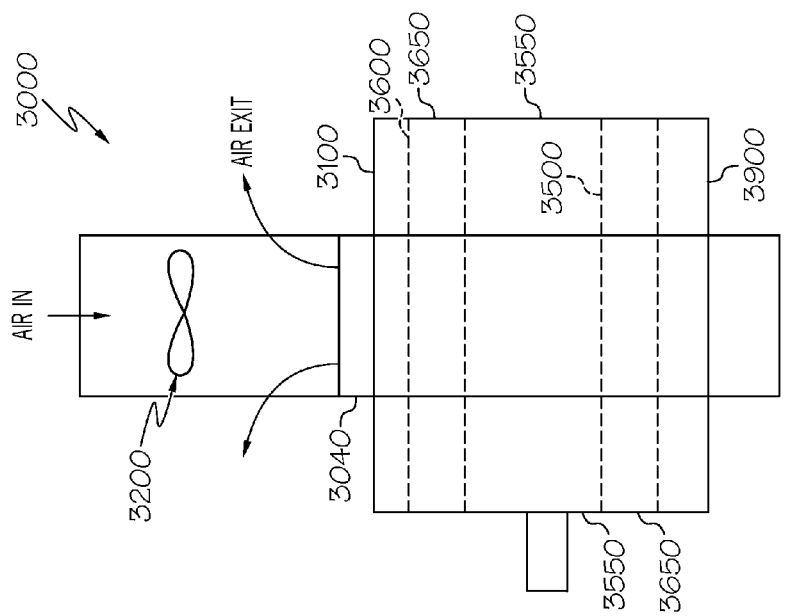

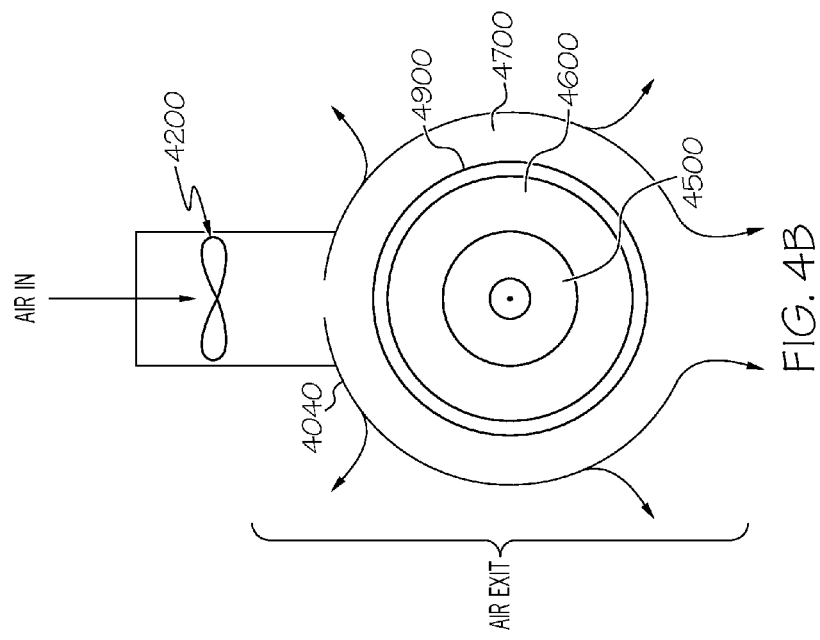
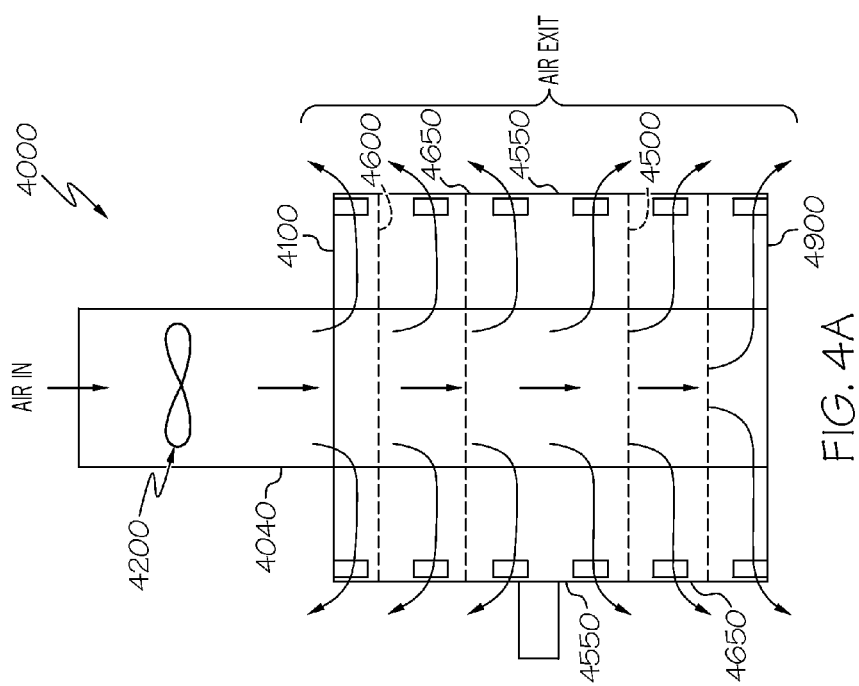

AIR COOLING OF A MOTOR USING RADIALLY MOUNTED FAN

BACKGROUND OF THE INVENTION

The present invention generally relates to air cooling of a motor using a radially mounted fan.

The fundamental requirement of the cooling of an electric machine is to achieve the required removal of heat so that the temperature distribution resulting from the losses associated with the energy conversion does not result in component temperatures that exceed the component thermal capability. The temperature distribution varies with the operating conditions of the motor, duty cycle, and environmental conditions including type of cooling. Cooling may be addressed with passive and active cooling methods. Passive cooling includes natural convection, radiation, and thermal conduction to the mounting structure. Active cooling includes forced air and forced fluid cooling. Active cooling may be applied to the internal components and external structure of the electric machine. A major requirement of a cooling system applicable to traction applications is to be contamination resistant due to harsh environment at such an installation. The significant components requiring proper thermal management are the windings of the electric machine, bearings, magnets, and touch surfaces.

Methods typically employed for cooling electric machines depend on the type of machine and include open, drip-proof and protected machines. These machines are physically open to the atmosphere such that convection occurs between the internal motor components and ambient. Shields and guards are often provided to prevent direct access or contact with the motor components.

Totally enclosed machines, however, are not open to ambient. This is primarily for protection against the environment. Heat rejection from these machines is accomplished with conduction to the structure and outer enclosure convection only, since the interior of the machine is not accessible to external cooling.

Totally enclosed forced ventilation machines are encapsulated machines typically with an external fan providing forced air over the motor housing. Cooling fins and channels are often used to direct the coolant flow and improve the heat transfer from the machine housing to the cooling medium. Liquid cooling can also be used for this type of machine.

Installations typical to aerospace and transportation applications require coordinated packaging and layout of the machine to conform with the space and envelope restrictions of the vehicle. In this architecture, the fan is typically shaft mounted and the coolant is forced axially over the machine outer housing. Nonetheless, whether the fan is electrically or mechanically driven, axial space is consumed by the fan and is, therefore, not available for the main electric machine.

Therefore, a need exists in the aerospace industry for an air cooling of a variable speed motor using a radially mounted fan.

SUMMARY OF THE INVENTION

In one aspect of the present invention, a motor cooling system is provided, comprising an electric motor including a rotor having first and second axial ends, and a stator having first and second axial ends, a motor housing surrounding the motor including an air chamber extending around the motor and axially along the motor length, a motor enclosure enveloping the motor housing; and a cooling fan radially mounted to the motor enclosure and adapted to operatively cool said electric motor.

These and other features, aspects and advantages of the present invention will become better understood with reference to the following drawings, description and claims.

BRIEF DESCRIPTION OF THE FIGURES

FIG. 2A and FIG. 2B are an illustration of a second exemplary embodiment of a radially mounted fan 2200.

FIG. 3A and FIG. 3B are an illustration of a third exemplary embodiment of a radially mounted fan 3200.

FIG. 4A and FIG. 4B are an illustration of a fourth exemplary embodiment of a radially mounted fan 4200.

DETAILED DESCRIPTION OF THE INVENTION

Figure 1B:
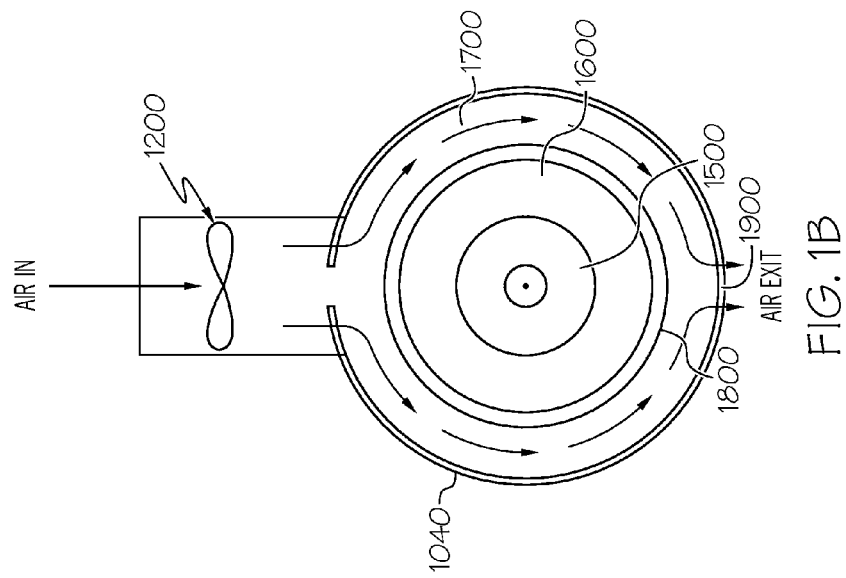
FIG. 1A and FIG. 1B are an illustration of a first exemplary embodiment of a radially mounted fan 1200.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that may each be used independently of one another or in combination with other features. However, any single inventive feature may not address any of the problems discussed above or may only address one of the problems discussed above. Further, one or more of the problems discussed above may not be fully addressed by any of the features described below.

Certain exemplary embodiments provide a system which may comprise an electric motor radially mounted cooling fan. The cooling fan may be radially mounted and may be driven by an auxiliary motor distinct from an electric motor adapted to be cooled by the cooling fan. The system may comprise a motor enclosure of the electric motor and the auxiliary motor. The motor enclosure may be configured in a predetermined ventilation pattern. Exemplary embodiments of the present invention may be used, for example, in cooling all types of motors, generators, electric brake or other energy conversion device. FIG. 1A is a perspective view of an exemplary embodiment of an electric motor system 1000 which may comprise an electric motor 1100. The electric motor 1100 may include a housing 1800, a rotor 1500 with axial ends 1550 and a stator 1600 with axial ends 1650. The electric motor 1100 may include a permanent magnet synchronous motor or any energy conversion device that is configured to be cooled via air circulating in a circular ventilation pattern. Heat generated by operation of the electric motor 1100 may be transferred from internal components via cooling air, which may be circulated by an electric motor cooling fan 1200. A motor cooling fan 1200 may be radially mounted and may be driven by an auxiliary cooling fan motor 1030 that is distinct from the electric motor 1100. The electric motor 1100 may be adapted to be cooled by the radially mounted cooling fan 1200. As illustrated, the radially mounted cooling fan 1200 may be mounted to a top surface of the electric motor 1100.

A motor enclosure 1040 of the electric motor 1100 may be configured in a ventilation pattern selected from a plurality of ventilation patterns comprising a combination of radial and circular airflow. In this configuration, air may be directed at the electric motor 1100 in the radial direction. Cooling flow may be forced in either direction, i.e., the fan may be configured to push air into or pull air through the cooling air passages. Combinations of enclosed channels and cooling fins may be used. The radially mounted fan 1200 may be axially positioned at different axial locations. The airflow exit may be purposely not axial to permit the electric motor 1100 to utilize the axial space for the electric motor 1100 and provide maximum torque production. The motor enclosure 1040 may be adapted to be operatively cooled by the radially mounted cooling fan 1200.

The motor housing 1800 may be selected from a group of enclosures comprising open machines (Drip-Proof (ODP), and Weather Protected (WPI/WPII) and totally enclosed machines (Fan Cooled (TEFC), Pipe-Ventilated (TEPV), Air Over (TEAO), Non-Ventilated (TENV), Air to Air (TEAAC), Water to Air (TEWAC), and Explosion-proof (XP); and those with encapsulated or sealed windings. The radially mounted cooling fan 1200 may be adapted to be operatively coupled to and/or operatively cool the motor housing 1800.

Figure 1A:
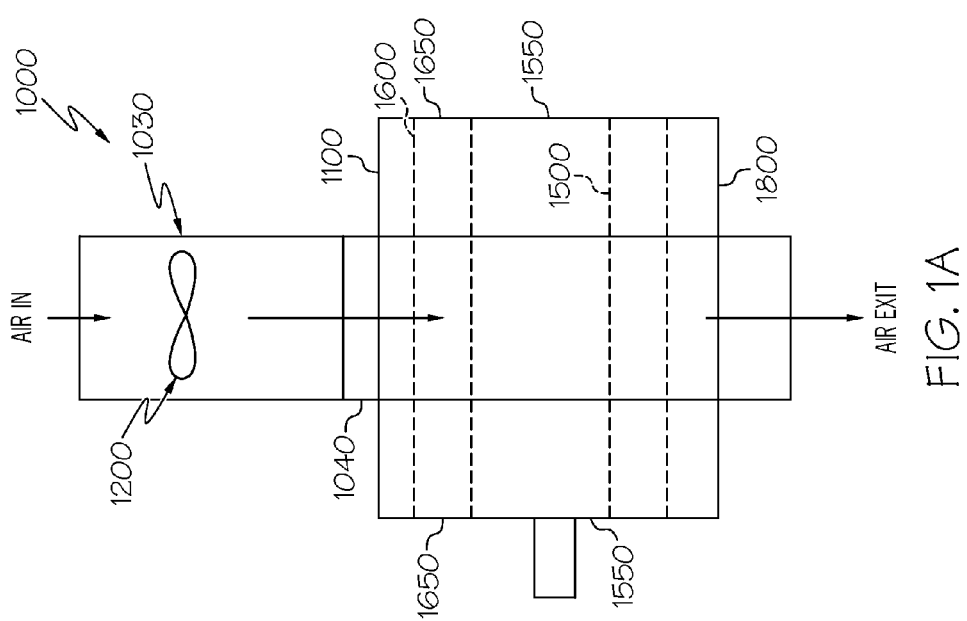

FIG. 1B is a cut-away view of an exemplary embodiment of the electric motor system 1000 of FIG. 1A, which may comprise the electric motor 1100 and the radially mounted cooling fan 1200. Cooling air may receive a motive force from the electric motor cooling fan 1200, may pass through a ventilation pattern pathway 1700 and may exit via one or more defined exhaust ports 1900.

FIG. 2A is a perspective view of an exemplary embodiment of an electric motor system 2000, which may comprise an electric motor 2100. The electric motor 2100 may include a housing 2900, a rotor 2500 with axial ends 2550 and a stator 2600 having axial ends 2650. The electric motor 2100 may be a permanent magnet synchronous motor or any energy conversion device that is configured to be cooled via air circulating through a motor enclosure 2040 in a circular or circumferential flow direction with axial flow exit direction ventilation pattern. Heat generated by operation of the electric motor 2100 may be transferred from internal components via cooling air, which may be circulated by an electric motor cooling fan 2200. As illustrated, the electric motor cooling fan 2200 may be mounted to a top surface of the electric motor 2100.

FIG. 2B is a cut-away view of an exemplary embodiment of the electric motor system 2000 of FIG. 2A, which may comprise the electric motor 2100 and the radially mounted cooling fan 2200. Cooling air may be channeled to the electric motor cooling fan 2200 via a ventilation pattern pathway 2700 and cooling flow may be forced in either direction, i.e. pressure or vacuum. A combination of enclosed channels and cooling fins may be used. Cooling air may receive a motive force from the electric motor cooling fan 2200 and may exit the motor enclosure 2040 axially.

FIG. 3A is a perspective view of an exemplary embodiment of an electric motor 3000, which may comprise an electric motor 3100 and a radially mounted cooling fan 3200. The electric motor 3100 may include a housing 3900, a rotor 3500 with axial ends 3550 and a stator 3600 having axial ends 3650 The electric motor 3100 may be a permanent magnet synchronous motor or any energy conversion that is configured to be cooled via air circulating in a circular ventilation pattern. Heat generated by operation of the electric motor 3100 may be transferred from internal components via cooling air, which may be circulated by the radially mounted cooling fan 3200 through a motor enclosure 3040. As illustrated, the radially mounted cooling fan 3200 may be mounted to a top surface of the electric motor 3100.

FIG. 3B is a cut-away view of an exemplary embodiment of the electric motor system 3000 of FIG. 3A, which may comprise the electric motor 3100 and the radially mounted cooling fan 3200 which may be positioned at differential axial locations. The electric motor 3100 may be substantially totally enclosed in that cooling air may be directed to that a ventilation pattern pathway 3700 is passes around the circumference of the housing 3900. Cooling flow may be forced in either direction, i.e. pressure or vacuum. A combination of enclosed channels and cooling fins may be used. Cooling air may receive a motive force from the electric motor cooling fan 3200.

FIG. 4A is a perspective view of an exemplary embodiment of an electric motor 4000, which may comprise an electric motor 4100. The electric motor 4100 may be a permanent magnet synchronous motor or any energy conversion device that is configured to be cooled via air circulating in a multi-directional flow ventilation pattern. Heat generated by operation of the electric motor 4100 may be transferred from internal components via cooling air, which may be circulated by an electric motor cooling fan 4200 through a motor enclosure 4040. As illustrated, the electric motor cooling fan 4200 may be mounted to a side surface of the electric motor 4100.

FIG. 4B is a cut-away view of an exemplary embodiment of an electric motor 4000 of FIG. 4A, which may comprise an electric motor 4100. The electric motor 4100 may include a housing 4900, a rotor 4500 with axial ends 4550 and a stator 4600 having axial ends 4650. The electric motor 4100 may be a permanent magnet synchronous motor or any energy conversion device that may be configured to be cooled via air circulating in a combination of radial, circumferential, and axial cooling air flow path ventilation pattern. Heat generated by operation of the electric motor 4100 may be transferred from internal components via cooling air, which may be circulated by an electric motor cooling fan 4200. As illustrated, the electric motor cooling fan 4200 may be mounted to a side surface of the electric motor 4100.

A motive force may be provided to the cooling air by the electric motor cooling fan 4200. The cooling air may be channeled to a heat generating portion of the electric motor 4100. The heat generating portion of the electric motor 4100 may comprise the rotor 4600 and the stator 4500.

As shown in FIG. 4B, a ventilation pattern pathway 4700 may utilize a combination of radial, circumferential, and axial cooling air flow path directions. Cooling flow may be forced in either direction, i.e., pressure or vacuum. A combination of enclosed channels and cooling fins may be used. The radially mounted fan 4200 may be axially positioned at different axial locations. A plenum may also be used at the coolant entrance and exit. One benefit of this arrangement may be that the cooling air path is not exited axially, which may allow the entire axial space available to be utilized by the electric motor 4100.

A working device with the flow configuration of FIG. 4, wherein the cooling paths comprise radial, circumferential, and axial air flow directions, was fabricated and tested. Two related tests were conducted.

In the first test, the cooling air pressure loss was measured at flows from about 7 to 20 lbm/min. It was observed that the density-corrected pressure loss of the air flowing through the cooling channels is about 0.75 psid at a 20 lbm/min air flow test condition.

In the second test, the heat transfer coefficient in the cooling channels was evaluated, also at flows from about 7 to 20 lbm/min. It was observed that a heat transfer coefficient of about 60 BTU/(hr*ft2*F) agreed with the observed temperature response of the motor housing and shell, at a 20 lbm/min air flow test condition.

The combination of the pressure loss and heat transfer characteristics thus obtained showed that the cooling channel pattern and the cooling air fan selected for the device of FIG. 4 will provide cooling flow adequate to maintain the drive motor below the maximum allowable winding temperature of about 392 F. The range of flows over which pressure loss and heat transfer data was obtained enables prediction of air flow rate and cooling capability if different cooling air fans, with reasonably similar known performance characteristics, are coupled with the same motor enclosure and cooling channel configuration.

Figure 5:
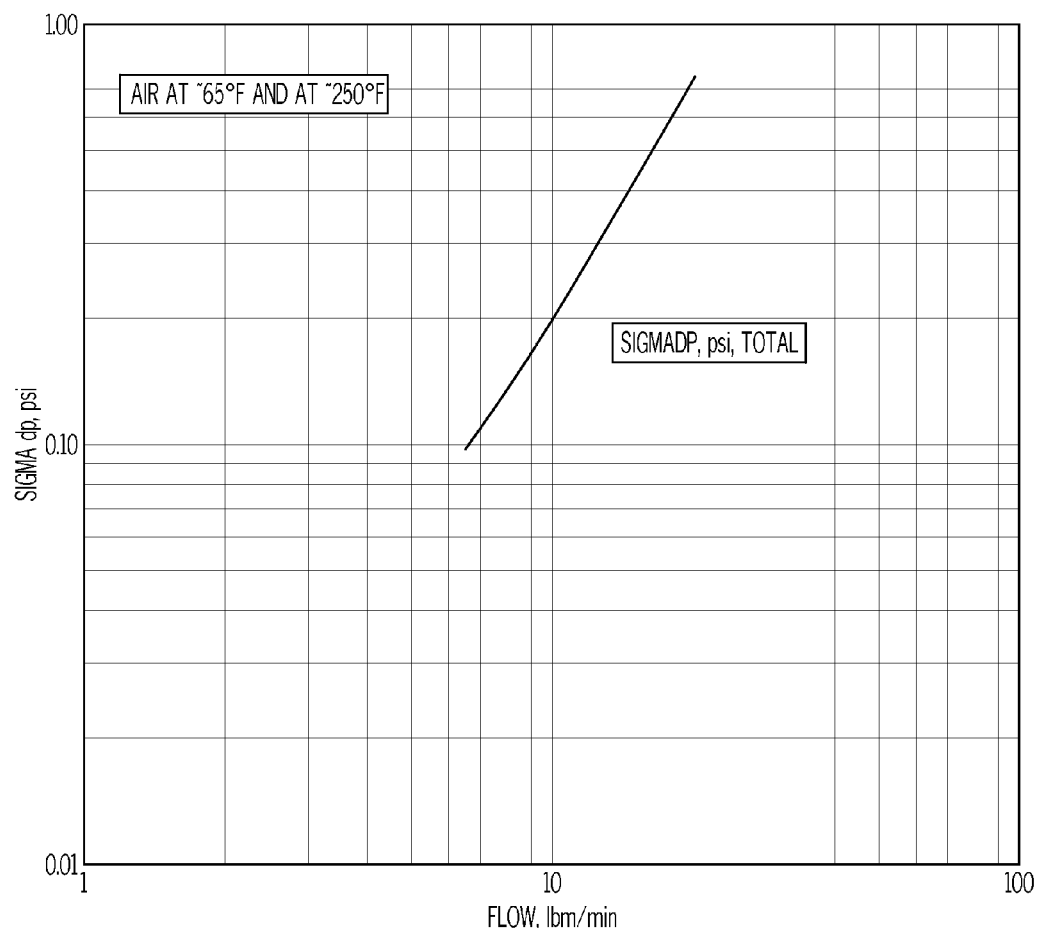
FIG. 5 is an illustration of isothermal pressure test results for air flow through housing cooling passages of the radially mounted fan 4200.

The cooling air pressure loss through the motor enclosure was measured by supplying air from a duct directly into the fan housing. The actual cooling fan was removed for this test and the air was allowed to flow directly through the fan housing into the cooling passages. The air exited through the several slots at the two ends of the motor enclosure. The air temperatures, flow rates, and the gauge pressure at the fan inlet housing were measured at flows from about 7 to 20 lbm/min. Each flow rate was run at ambient temperature and at 250° F. The characteristic of the fan of flow versus pressure rise curve had already been established. The combination of motor enclosure pressure loss curve and fan pressure rise curve confirmed the cooling air flow agreed with previous analytical predictions. The test results from the isothermal pressure loss testing are shown in FIG. 5.

Figure 6:
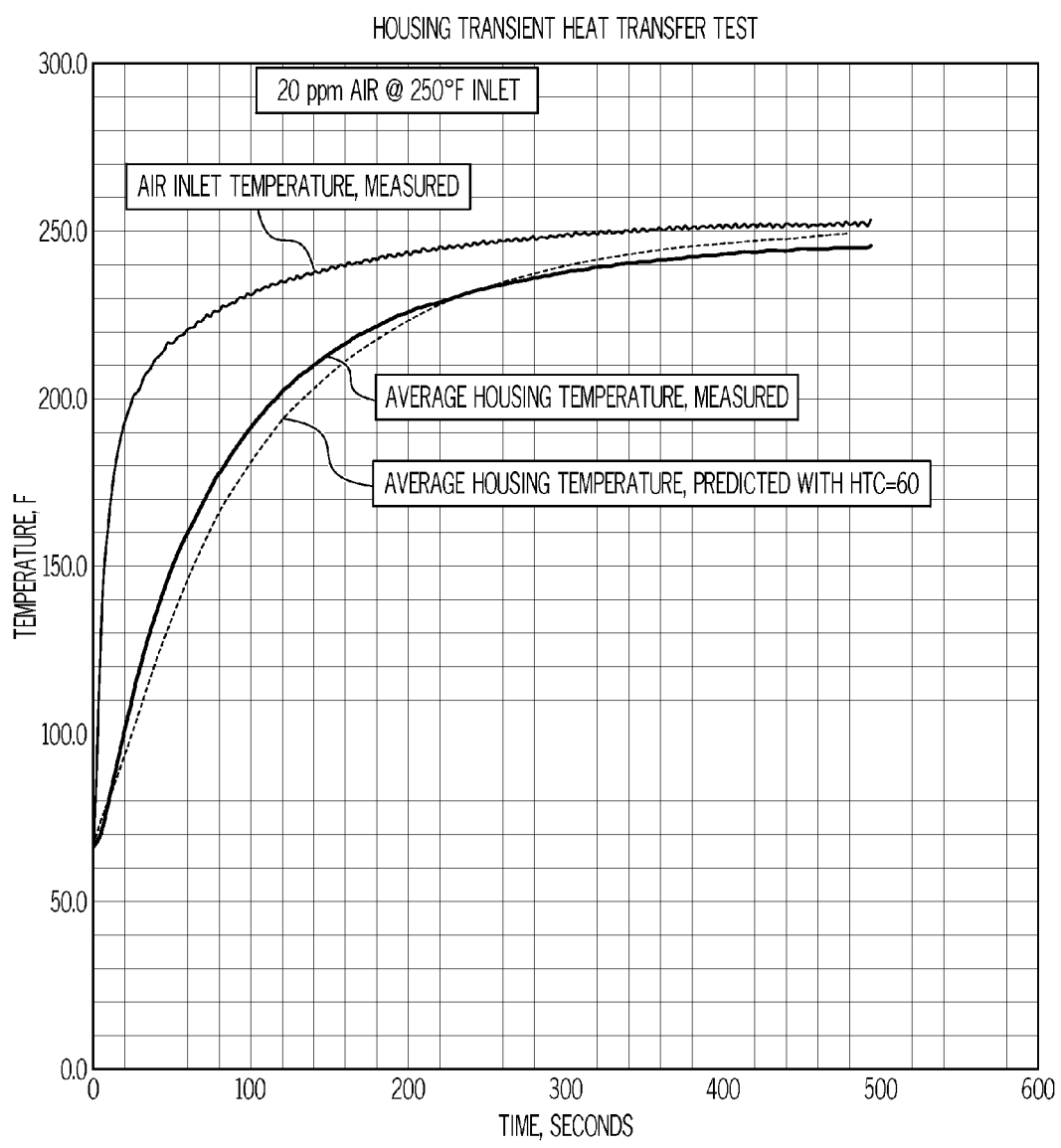
FIG. 6 is an illustration of heat transfer results for air flow through housing cooling passages of the radially mounted fan 4200.

The heat transfer rate between the air and the housing was established using a transient test. The heat transfer was evaluated by measuring the speed at which the housing metal temperature responded to step-changes in the temperature of the air flowing through the cooling channels. Known flow rates of air, preheated to a known temperature, were directed into the housing, which started the transient tests always at a uniform ambient temperature. The rate at which the housing temperature increased in response to the incoming air was used to evaluate the heat transfer conductance between the air and the housing. A plot of the inlet air temperature, average metal temperature, and an analysis result matching the metal temperature data, is given in FIG. 6. The housing metal temperatures were measured using thermocouples placed around the interior of the housing. Three sets of four thermocouples were used, located 90 degrees apart circumferentially around the housing interior diameter, one set at each end and one at the center of the housing. This calculation was conducted at a number of different air flow rates and temperatures. The measured results and the matching analytical prediction, from one of the transient heat transfer test conditions are shown in FIG. 6.

With various possible embodiments of the invention, a number of results deemed desirable may be pursued. For example, the volume available for the main propulsion machine may be increased due to replacement of an axially mounted cooling fan with a radially mounted fan. The torque production of the electric motor may be increased due to increased available volume. The surface of the housing may be larger allowing for an improved cooling. Cooling flow may be forced in either direction, i.e., pushed into or pulled through the air chamber, which may present additional flexibility for a specific implementation. The radially mounted fan may be positioned at different axial locations, which may present additional flexibility for a specific implementation. The use of the separately powered, radially mounted fan may provide continuous maximum cooling independent of the electric motor shaft speed and load. Various possible embodiments may provide contamination tolerance since all motor components may be fully encapsulated within the housing; hence all components and the air-gap may not be exposed to the environment. Various possible embodiments may provide contamination tolerance due to multiple passages and fins in case of foreign object presence. Various possible embodiments may provide stall protection of the induction machine based fan due to the multiple passages and fins in case of foreign object presence It should be understood, of course, that the foregoing relates to exemplary embodiments of the invention and that modifications may be made without departing from the spirit and scope of the invention as set forth in the following claims.

We claim:
1. A motor cooling system, comprising:
an electric motor; including a rotor and a stator;
a motor enclosure enveloping a portion of the motor
a ventilation pattern pathway within the motor enclosure, the ventilation pattern pathway passing circumferentially around the motor; and
a cooling fan mounted to the motor enclosure, in fluid communication with the ventilation pattern pathway, for cooling said electric motor by producing air flow that passes circumferentially around the motor;
wherein an axis of the fan is offset from an axis of the rotor so that the axis of the fan does not intersect the axis of the rotor;
wherein the ventilation pathway has an air inlet and an air outlet, the air outlet being positioned adjacent to the air inlet and on the same side of the stator as the air inlet;
wherein the fan is positioned within the air inlet of the ventilation pathway;
wherein circumferential airflow around the motor is unidirectional; and
wherein airflow through the air outlet is opposite in direction from airflow through the air inlet.
2. The system of claim 1, wherein said motor has a totally enclosing housing.

* * * * *